United States Patent [19]
Baron et al.

[11] 4,084,792
[45] Apr. 18, 1978

[54] CARGO HOLDER JACK

[76] Inventors: Raul Baron, 15281 SW. 308 St., Leisure City, Fla. 33030; Oscar Baron, 2611 SW. 36 Ave., Miami, Fla. 33133

[21] Appl. No.: 768,680

[22] Filed: Feb. 15, 1977

[51] Int. Cl.² .............................................. B66F 1/00
[52] U.S. Cl. ................................................... 254/106
[58] Field of Search ......................................... 254/106

[56] References Cited
U.S. PATENT DOCUMENTS

| | | | |
|---|---|---|---|
| 2,239,268 | 4/1941 | Lucker | 254/106 |
| 2,974,931 | 3/1961 | Reel et al. | 254/106 |
| 3,136,528 | 6/1964 | Eatough | 254/106 |

Primary Examiner—Robert C. Watson
Attorney, Agent, or Firm—Peck & Peck

[57] ABSTRACT

This invention relates to a manually operated jack which is particularly adapted to hold cargo in place in moving trucks, railroad cars or to store merchandise in warehouses and in other generally similar environments. The cargo holder jack generally involves a hollow pedestal member upon which the operating components of the jack are operatively mounted. The pedestal is mounted on a base or foot element which is pivotally connected thereto. An operating rod is provided which is mounted for reciprocal movement and this operating rod is free of the pedestal so it may reciprocate therein and independently thereof. On the end of the operating rod, which is opposite to the portion thereof which reciprocates within the pedestal, is pivotally mounted a base or foot member. A box-like structure composed of two elements is mounted on the pedestal and operatively mounted therein are the various operating components which are associated with the operating rod to cause reciprocal movement thereof. Projecting from the box-like structure is a manual operating means for causing movement in one direction of the operating rod and further projecting means is provided for maintaining the operating rod in a particular reciprocated position and for releasing the same so that it may reciprocate further into the pedestal. The box-like structure mounts therein means which provides two compartments within said box-like structure.

4 Claims, 6 Drawing Figures

FIG. 2.
FIG. 3.
FIG. 4.
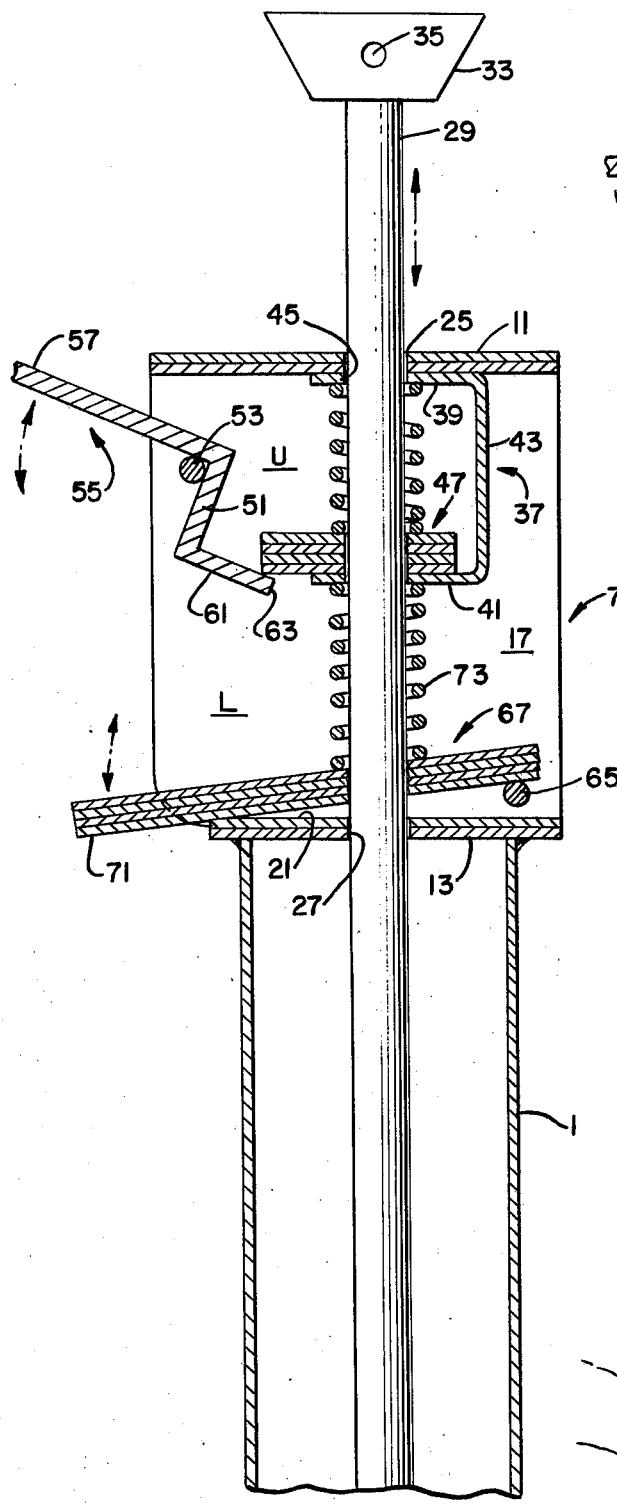
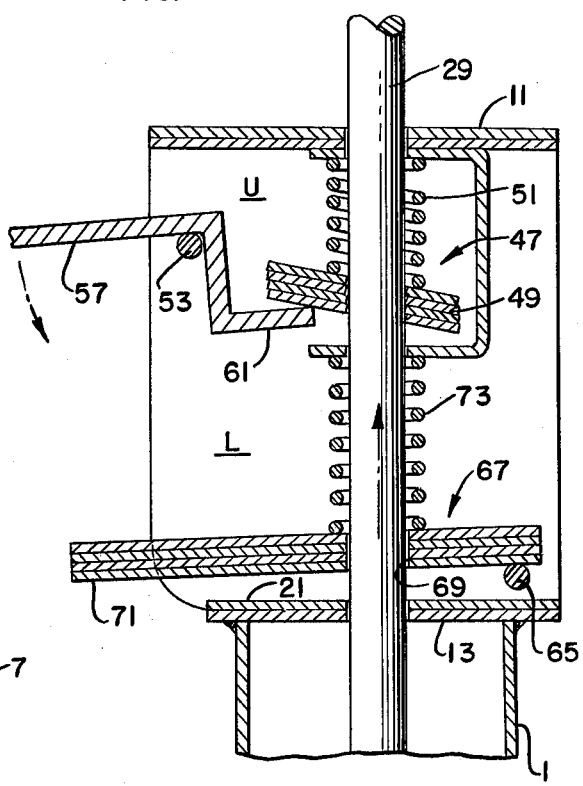
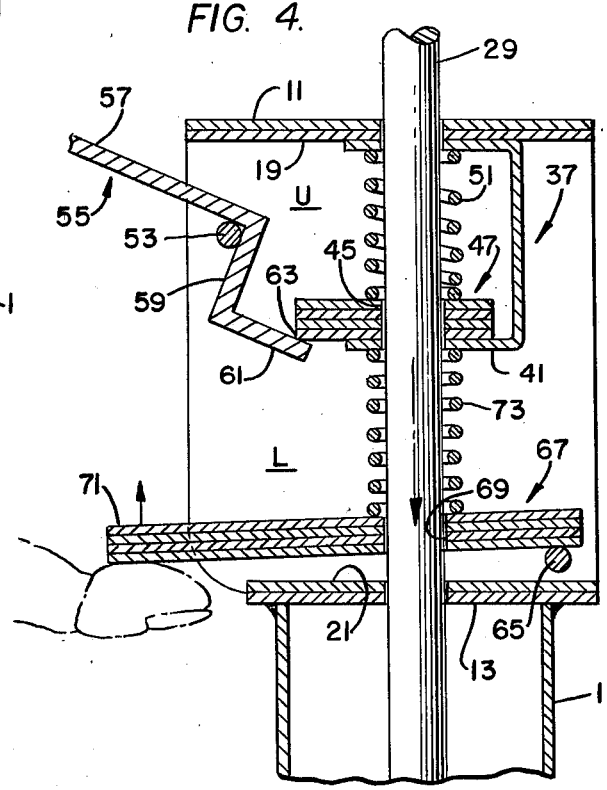

CARGO HOLDER JACK

SUMMARY OF THE INVENTION

This invention relates to a cargo holder jack of a unique nature which has been particularly designed and adapted for holding cargo in place in various types of moving vehicles. It is a manually operated apparatus and has been devised with a rapid and automatic releasable locking means to maintain the two ends of the jack in properly adjusted position. The locking means is easily manipulated to unlocked or releasing position so that the jack may be manually operated to release the held cargo or to be set in proper position for maintaining the load against movement when in movable vehicles.

The cargo jack involves a base portion provided on the end thereof with a shoe or support element which is pivotally mounted on the end of the base or pedestal portion. The cargo jack involves what we shall term an "operating rod" which is reciprocal within the hollow base or pedestal to extend therefrom a distance which may be adjusted by means of the manually operable components. On the free end of the operating rod is pivotally mounted a shoe or support element. It will thus be appreciated, and will be described in detail hereinafter, that the two pivotally mounted shoes or supports which are pivotally positioned on each end of the jack will accommodate various angular positions which the jack must accommodate in its cargo holding function.

Mounted upon the top of the base or pedestal of the apparatus is a box-like structure through which the operating rod extends and within this box-like structure and associated with the operating rod are a plurality of rod actuating components and rod locking and releasing components.

Additional objects and advantages of the present invention will become more readily apparent to those skilled in the art when the following general statements and descriptions are read in the light of the appended drawings.

BRIEF DESCRIPTION OF THE DRAWINGS

FIG. 2 is a sectional view taken on the line 2—2 of FIG. 1.

FIG. 3 is a sectional view generally similar to FIG. 2 with the exception that the operating rod is illustrated being driven upwardly by the manually operated lever.

FIG. 4 is a sectional view generally similar to FIGS. 2 and 3 with the exception that the operating rod locking mechanism is illustrated in operating rod unlocking releasing position.

DETAILED DESCRIPTION

Figure 1:
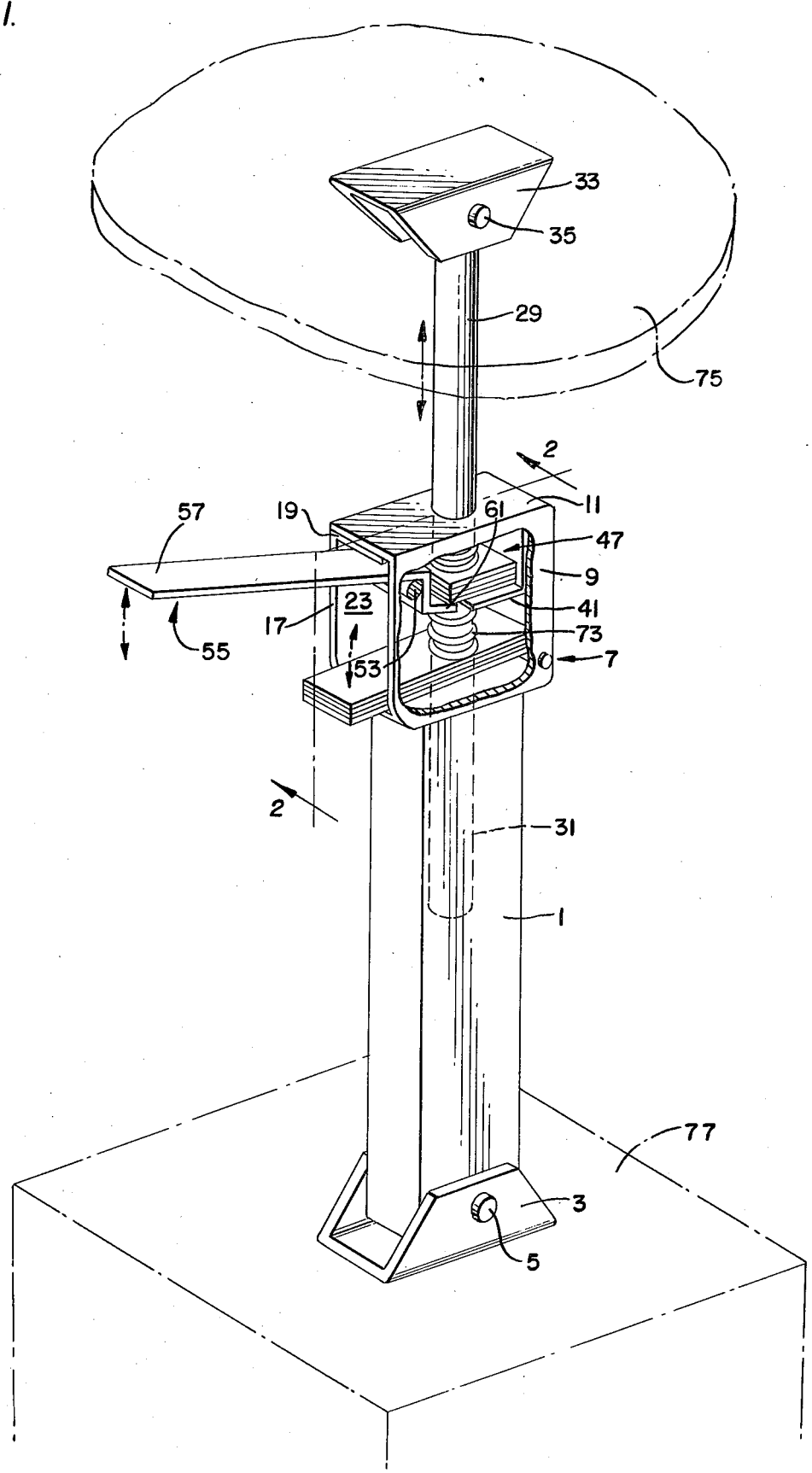
FIG. 1 is a perspective view of the cargo holder jack in operative load holding position.

In the accompanying drawings the numeral 1 has been used to designate the base or pedestal of the apparatus. This base or pedestal is preferably of hollow construction for a purpose to be hereinafter described, and while illustrated as being of rectangular configuration may be of any desired shape and length for the work which it is adapted to perform. It is of rigid construction and is preferably fabricated by cutting, bending or the like. At the base or lower end of the pedestal 1 we pivotally mount a shoe, foot or the like 3 by means of a pivot pin 5. It will now be appreciated that the pedestal 1 may have a slight rocking or pivoting motion with respect to the shoe 3.

Affixed in any suitable manner to the opposite, or the top end of the pedestal 1 is an open ended box-like structure designated in its entirety by the numeral 7. This box-like structure 7 is composed of two parts which are of generally channel construction, the outer part forming an element of the box-like structure being designated by the numeral 9 and having a top portion 11 and a bottom portion 13. It will be recognized that the outer part 9 which forms an element of the box-like structure is of generally U shape and as one side thereof, as well as one end thereof is open. The other or inner part which forms an element of the box-like structure is of generally U shaped configuration and comprises a side 17, a top 19 and a bottom 21. The inner part is snugly received within the outer part of the box-like structure as is clearly evidenced by careful consideration of the drawings. When the inner and outer parts which form the box-like structure are assembled and in operative box-like forming position, the side 17 of the inner part forms a side wall of the box-like structure while the side 9 of the outer part forms a side wall so that when the inner and outer parts are assembled together a box-like structure will result having one open end 23. The top walls 11 and 19 are apertured as at 25 and the bottom walls 13 and 21 are apertured as at 27 and all of these apertures are in alignment when the inner and outer U shaped parts are assembled in operative box-like forming relationship.

An operating rod 29 is provided and freely extends through the apertures 25 and 27 and into the hollow base or pedestal 1 as at 31. The operating rod 29 is adapted for reciprocation through the box-like structure 7 and is manually operated by means which will be hereinafter described. On the outer end of the operating rod 29 we pivotally mount a shoe, foot or the like 33 as at 35 so that limited rocking motion may occur between the shoe and the operating rod.

Within the box-like structure 7 we provide a generally U shaped element which is designated in its entirety by the numeral 37, the open end of the U shaped element 37 being directed toward the open end 23 of the box-like structure. The generally U shaped element 37 consists of an upper arm 39 and a lower supporting arm 41, the two arms 39 and 41 being connected together at their rear ends by a preferably integrally formed rear wall 43. The upper arm 39 of the element 37 is fixed in any suitable manner to the top 19 of the inner part of the U shaped box-like structure and depends from the point of fixation a distance into the interior of the box-like structure. Each arm 39 and 41 is apertured as at 45 and the operating rod 29 reciprocably extends through these apertures in the arms of the element 37. It will now be recognized that the generally U shaped element 37 in effect compartmentalizes the interior of the box-like structure 7 into an upper compartment U and lower compartment L. The upper compartment U contains the various elements by means of which the reciprocation of the operating rod 29 is accomplished while the lower compartment houses the operating rod releasing and locking means.

We provide four relatively small wedging plates which are designated by the numeral 47. The utilization and illustration of four wedging plates is for purposes of illustration only and it is to be understood that fewer or more plates may be used and such structure will fall within the spirit and scope of this invention. Each of said wedging plates of the series of said wedging plates is apertured as at 49 and the operating rod 29 reciprocably extends through these apertures. Coiled about the operating rod 29 and extending between the arm 39 and the top most plate of the series of wedging plates 47 is a compression spring 51.

Fixed at each end to and extending between the side 17 and the side 9 of the box-like structure 7 is a fulcrum pin 53 and mounted on and extending over for fulcruming action thereon is a manually actuable wedging plate lever designated generally by the numeral 55. Such actuating lever comprises an elongated portion 57 which extends over the fulcrum pin 53 and outwardly beyond the box-like structure. The lever 55 is of stepped construction as at 59 providing an inwardly extending foot 61 which, as will be clear from the drawings, is in engagement with the underside of the series of wedging plates 47 as at 63.

In the lower compartment L of the box-like structure, we provide the manual operating means for releasably locking the operating rod in any reciprocably adjusted position and also to unlock and free said operating rod for movement into and out of the pedestal 1.

A further fulcrum pin 65 is fixed to and extends between the walls of the box-like structure 7 and this fulcrum pin is fixed in this position adjacent to but removed from the lower end of the box-like structure and toward the rear end thereof. A series of locking and releasing wedging plates are designated generally by the numeral 67 and these locking and releasing wedging plates are dimensionally larger than the series of wedging plates 47. While we have disclosed in the drawings four of such plates 67, this has been done as merely an example and not by way of limitation and more or fewer plates may be used. Each plate of the series of plates 67 is apertured as at 69 so that the operating rod 29 may extend through these apertures. The rear end of the plates 67 are supported and fulcrumed on the pin 65 and extend therefrom and through the open end of the box-like structure as at 71. Coiled about the operating rod is a compression spring 73 which extends between the lower supporting arm 41 of the generally U shaped element 37 and the upper plate of the series of plates 67.

In FIG. 1 of the drawings we have illustrated the cargo jack in operative position extending between a load shown in phantom lines at 75 and a fixed supporting means 77. By manual manipulation of the operating lever 55 the series of wedging plates will be angled and wedge with and produce upward movement of the operating rod 29. When the rod has been reciprocated or driven upwardly by the plates 47, and lever 55 is loosely mounted on fulcrum 53 the plates will be returned to their normal position by the coil spring 51, such normal position of the plates being illustrated in FIGS. 2 and 4. Since the normal operating rod locking position of the series of plates 67 is at an angle as illustrated in FIG. 2 and partially in FIG. 4, a wedging action on the rod will occur to releasably lock the operating rod in its adjusted position. It will be appreciated that the spring 73 which is bearing against the series of plates 67 will releasably maintain this series in wedged releasable locking position with respect to the operating rod 29. When it is desired to unlock or release the operating rod for reciprocation, the projecting end 71 of the series of plates 67 will be manually lifted upwardly as illustrated in FIG. 4, so that the operating rod may move. This wedging action of the series of plates 47 and 67 occurs because the apertures through both series of plates are of slightly larger diameter than the diameter of the operating rod 29.

The use of a series of plates rather than a single plate involves certain inherent advantages since a series of plates are more flexible, in that they adjust better to the rod and are not as rigid as a single plate. Also a series of plates facilitates the movement and operating thereof and have a greater strength characteristic than does a single plate.

The box-like structure is relatively easy to assemble and the attachment thereof to a support is clearly facilitated.

Figure 5:
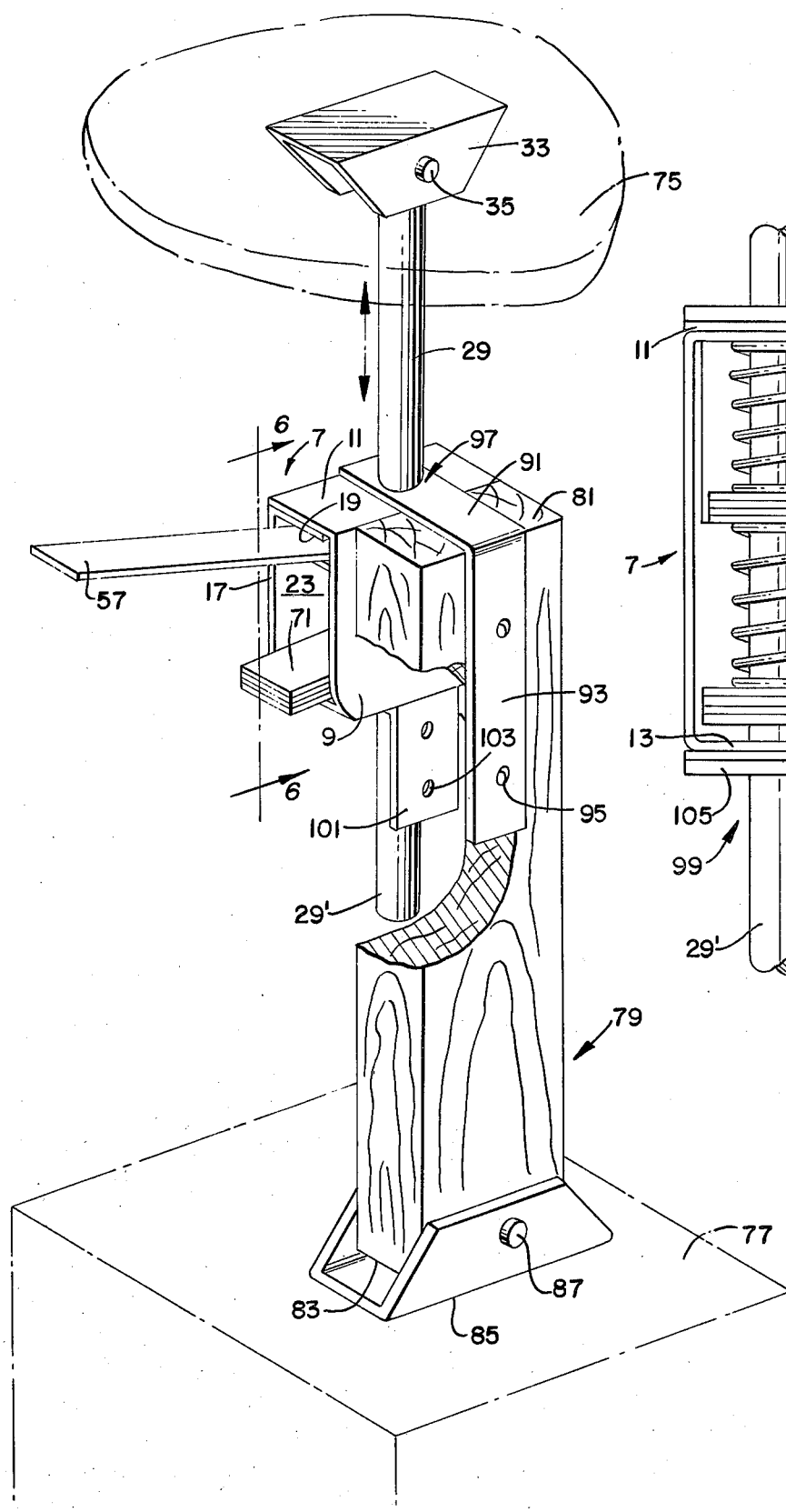
FIG. 5 is a perspective view of the modified form of cargo holder jack in operative load holding position.
Figure 6:
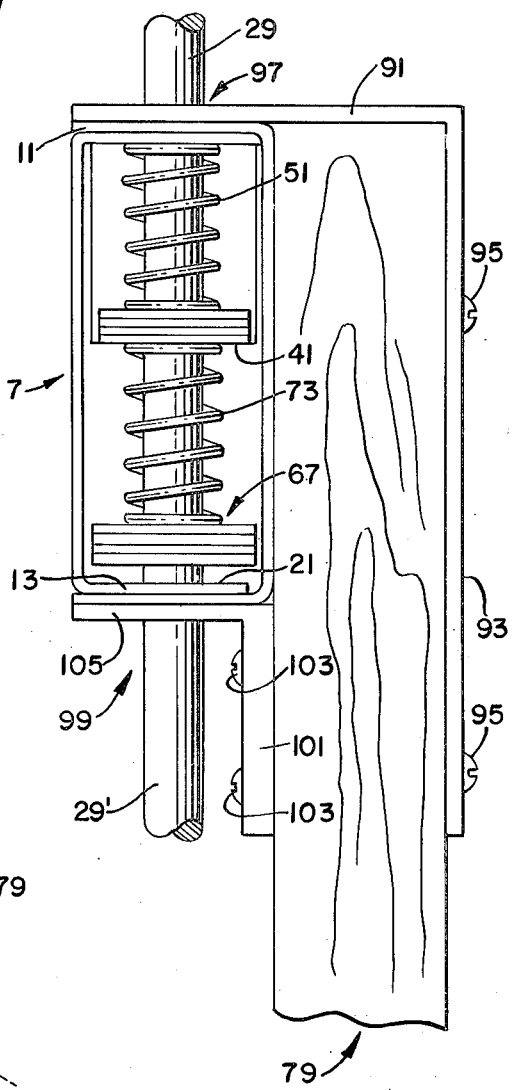
FIG. 6 is a view taken on the line 6—6 of FIG. 5.

In FIGS. 5 and 6 of the drawings, a modified form of the invention has been illustrated and we have used the same reference numerals as heretofore used to describe similar parts.

A solid wood pedestal is designated generally by the numeral 79 and dimensionally this solid wood pedestal is on the order of 2×4 inches and comprises a top 81 and a bottom 83. Mounted on the bottom 83 of the pedestal is a foot or base member 85 which is pivotally mounted to the pedestal by means of a pivot pin 87. The box-like structure which is indicated generally by the numeral 7 is of substantially the same construction as that illustrated in FIG. 1 of the drawings and in view of this will not now be described in detail.

In this modified form of the invention, the box-like structure 7 is mounted and fixed to the side of the pedestal or base 79 instead of being mounted on the top of the pedestal. When the box-like structure, which includes the operating components of the jack, is fixed to the side of the pedestal 79, the top 11 of the box-like structure is in substantially the same horizontal plane as the top 81 of the pedestal. An angle bracket designated in its entirety by the numeral 89 comprises a top, transverse portion or leg 91 and a depending preferably integral portion 93. The depending portion 93 of the bracket 89 depends downwardly a distance along the side of the pedestal which is opposite to the side thereof to which the box-like structure 7 is fixed. The depending portion 93 is bolted or otherwise fixed to the side of the pedestal as at 95. The upper or transverse leg 91 of the bracket 89 extends across the upper surface 81 of the pedestal and therebeyond and over and in abutment with the top 11 of the box-like structure 7. The transverse leg 91 of the angle bracket is provided with an aperture therein which is designated generally by the numeral 97 and is adapted to reciprocably receive therethrough the operating rod 29 of the jack. A further box-like structure 7 supporting angle bracket is designated in its entirety by the numeral 99. The supporting structure 99 co-acts with the bracket 89 in properly positioning and mounting the box-like structure on the pedestal 79. The supporting angle bracket 99 consists of a depending portion 101 which is fixed as at 103 by bolting or any other suitable means to a side or a face or surface of the pedestal from that to which the depending portion 93 of bracket 89 is fixed. The bracket 99 also comprises a box-like supporting transverse leg 105 which extends beneath the box-like structure and is in supporting engagement with the bottom 13 of the box-like structure. It is to be noted that the length of the leg 105 is substantially the same as is the width of the box-like structure, and the leg 105 is provided with an aperture through which the operating rod reciprocably extends.

It will now be evident that due to this particular construction which has just been described, the box-like structure is firmly and soundly fastened to the solid wood pedestal of the jack, since the portion 91 of the bracket 89 will resist and stop upward movement of the box-like structure when the operating components therein are actuated and the box-like structure will be supported against downward movement by means of the leg 105.

As in the preferred form of our invention, the operating rod 29 is provided at its top with a foot member 33 which is pivotally mounted thereto by pivot pin 35.

It will now be clear that with operating rod 29 in its reciprocatory movements through the box-like structure as heretofore described will be completely free of the solid wood pedestal 79 and the portion of the operating rod 29' which extends below the box-like structure will reciprocate along the side of the wood pedestal but removed therefrom.

It has been found that in certain installations, the use of a cargo holder jack of the character of that described in FIGS. 5 and 6 is of substantial utility and will be economical to produce and assemble.

What is claimed is:

1. A cargo holder jack including a base, an operating rod extending into said base and being reciprocable therein, means for driving said operating rod outwardly from said base, and further means for releasably locking said operating rod in any reciprocated position, said operating rod extending through said means and said further means, a generally enclosed structure having an open end mounted on said base and said means and said further means being operatively mounted thereon, said enclosed structure is composed of two parts, one being received within the other, and the operating rod extends therethrough and a member is fixed to the upper wall of the part of the structure which is received within the other part thereof and said member extends therefrom into said structure, said operating rod extending through said member and said member forming an upper and lower compartment in said structure.

2. A cargo holder jack in accordance with claim 1, wherein said means is positioned in said upper compartment and said further means is positioned in said lower compartment.

3. A cargo holder jack in accordance with claim 1, wherein said member is of general U-shaped configuration and includes two arms connected together in spaced relation by a rear wall, one of said arms being fixed to said structure and the other spaced from said one arm, said means including at least one wedging element and said at least one wedging element when in inoperative position seated on said other arm.

4. A cargo holder jack in accordance with claim 3, wherein compression means is provided one end being in engagement with said one arm and the other end being in engagement with said at least one wedging element and urging said wedging element into seated engagement on said other arm.

* * * * *